United States Patent
Cohen et al.

(10) Patent No.: US 8,939,469 B2
(45) Date of Patent: Jan. 27, 2015

(54) STATIC DISSIPATIVE FLUID CONVEYING COUPLER

(75) Inventors: David Cohen, Seattle, WA (US); Arvid J. Berg, Seattle, WA (US); James P. Irwin, Renton, WA (US)

(73) Assignee: The Boeing Company, Chicago, IL (US)

( * ) Notice: Subject to any disclaimer, the term of this patent is extended or adjusted under 35 U.S.C. 154(b) by 582 days.

(21) Appl. No.: 13/166,199

(22) Filed: Jun. 22, 2011

(65) Prior Publication Data
US 2012/0326434 A1    Dec. 27, 2012

(51) Int. Cl.
| | |
|---|---|
| *F16L 21/00* | (2006.01) |
| *F16L 25/02* | (2006.01) |
| *F16L 25/03* | (2006.01) |
| *B29C 70/20* | (2006.01) |
| *B29C 70/22* | (2006.01) |
| *B29C 70/88* | (2006.01) |

(52) U.S. Cl.
CPC ............... *F16L 25/03* (2013.01); *B29C 70/205* (2013.01); *B29C 70/222* (2013.01); *B29C 70/882* (2013.01)
USPC ........................... 285/53; 285/222.1; 285/398

(58) Field of Classification Search
USPC .......... 285/371, 398, 53, 222.1, 222.2, 222.3, 285/222.4, 222.5
See application file for complete search history.

(56) References Cited

U.S. PATENT DOCUMENTS

| | | | | |
|---|---|---|---|---|
| 3,111,143 | A * | 11/1963 | Frieder et al. | 138/124 |
| 3,140,106 | A * | 7/1964 | Thomas et al. | 285/222.4 |
| 3,989,280 | A * | 11/1976 | Schwarz | 285/55 |
| 4,367,889 | A * | 1/1983 | Redl | 285/222.2 |
| 4,802,404 | A * | 2/1989 | Dirkin et al. | 92/171.1 |
| 6,405,762 | B1 * | 6/2002 | Bunch | 138/109 |
| 2008/0169643 | A1 | 7/2008 | Marban et al. | |
| 2010/0001512 | A1 | 1/2010 | Breay et al. | |

FOREIGN PATENT DOCUMENTS

| | | |
|---|---|---|
| DE | 27 02 925 | 1/1977 |
| WO | 2009 035344 A2 | 3/2009 |
| WO | 2011 144440 A1 | 11/2011 |

OTHER PUBLICATIONS

International Search Report and Written Opinion issued in International Application No. PCT/US2012/037358, mailed Aug. 2, 2012.

* cited by examiner

*Primary Examiner* — James Hewitt
(74) *Attorney, Agent, or Firm* — Armstrong Teasdale LLP

(57) ABSTRACT

A rigid coupler for use in electrically isolating an electrically conductive fluid conveyance system is described. The rigid coupler includes a nonconductive liner having a first end configured to couple to a first adjoining section of the fluid conveyance system, and a second end, opposite said first end, configured to couple to a second adjoining section of the fluid conveyance system. A reinforcing structure circumscribes the nonconductive liner and is coupled to a portion of the nonconductive liner extending between the first and second ends of the nonconductive liner. The reinforcing structure includes a multi-axial braided fiber material impregnated with a matrix material. A fiber overwrap is hoop wound about at least a portion of the reinforcing structure between the first and second ends of the nonconductive liner.

13 Claims, 12 Drawing Sheets

US 8,939,469 B2

STATIC DISSIPATIVE FLUID CONVEYING COUPLER

BACKGROUND OF THE DISCLOSURE

The field of the disclosure relates generally to couplers for use in conveying fluid in a fluid conveyance system, and more specifically, to dielectric hydraulic isolator fittings.

When a fluid (e.g. gas, liquid, gas/liquid) flows through a fluid conveyance system, a static charge may build up. The built up static charge may be sufficient to cause sparking between the tubing in the fluid conveyance system and other nearby components. Further, in equipment that may be exposed to lightening, such as aircraft, lightening may induce an additional charge into the fluid conveyance system.

To limit the buildup of static charge in a fluid conveyance system, tubular dielectric fittings are often used to couple adjoining sections within the fluid conveyance system. Such dielectric fittings may include integral fitting connections that permit connections of tubes, hoses, or other fluid-carrying components, while providing a relatively high electrical resistance path that limits electrical current flow between the two fitting connections and that allows a gradual dissipation of static charge.

At least some known dielectric fittings are designed to extend through the bulkhead of a vessel, such as an aircraft and permit pressurized fluid to travel from side to side. Dielectric fittings used to provide a conduit for transferring liquid through an aircraft bulkhead are sometimes referred to as static dissipative hydraulic isolator fittings. Such fittings dissipate electrical energy from static charges and also provide a safe fluid passage for the fluid passing through the fuel tank or other areas of the aircraft. Moreover, such dielectric fittings generally withstand significant fluid pressures, and mechanical stress and strain.

However, despite their advantages, at least some of such fittings utilize a non-conductive helical fiber wound reinforcement layer that can make analysis of pressure, stress and strain complex and difficult to predict. Moreover, excessive contact with moisture and/or fuel and prolonged stress may cause premature failure of dielectric fittings over time.

Various aspects of the present disclosure overcome these and other problems described above.

SUMMARY

A rigid coupler for use in conveying fluid within a fluid conveyance system is provided. The rigid coupler includes a nonconductive liner having a first end configured to couple to a first adjoining section of the fluid conveyance system, and a second end, opposite said first end, configured to couple to a second adjoining section of the fluid conveyance system. A reinforcing structure circumscribes the nonconductive liner and is coupled to a portion of the nonconductive liner extending between the first and second ends of the nonconductive liner. The reinforcing structure includes a multi-axial braided fiber material impregnated with a matrix material. A fiber overwrap is hoop wound about at a least a portion of the reinforcing structure between the first and second ends of the nonconductive liner.

In another aspect, a method of making a rigid coupler for use in conveying fluid is provided. The method includes forming an assembly including a reinforcing structure, a first outer end fitting, and a second outer end fitting. The reinforcing structure includes an interior cavity defined therein, and a composite braid. The composite braid includes multi-axial braided fiber material and a first matrix material. The first and second outer end fittings each circumscribe a portion of the reinforcing structure. The first outer end fitting is spaced apart from the second outer end fitting along a length of the reinforcing structure. The method includes forming a composite overwrap about at least a portion of the reinforcing structure between the first and second outer end fittings. The composite overwrap includes hoop wound fiber material and a second matrix material In still another aspect, an assembly for use in a rigid coupler is provided. The assembly includes a reinforcing structure, a first outer end fitting, and a second outer end fitting. The reinforcing structure includes a multi-axial braided fiber material impregnated with a matrix material, and the reinforcing structure defines an interior cavity therein. The first outer end fitting circumscribes a portion of the reinforcing structure, and the second outer end fitting circumscribes a portion of the reinforcing structure. The second outer end fitting is spaced apart from the first outer end fitting along a length of the reinforcing structure.

The features, functions, and advantages that have been discussed can be achieved independently in various embodiments or may be combined in yet other embodiments further details of which can be seen with reference to the following description and drawings.

DETAILED DESCRIPTION OF THE DISCLOSURE

A rigid coupler for use in conveying fluid between adjoining sections of a fluid conveyance system and methods for assembling the same are described herein. Although the rigid coupler and the methods are described for use with an aircraft and dielectric hydraulic isolator fittings, aspects of this disclosure may be used in other areas and applications and with other types of fluid couplers. The embodiments described herein may provide increased strength and durability over other known dielectric fittings. Moreover, the described embodiments may simplify analysis of the effects of stress, strain, pressure, etc. as compared to some known dielectric fittings. Further, at least some embodiments of this disclosure may provide better sealing than some known dielectric fittings.

Figure 1:
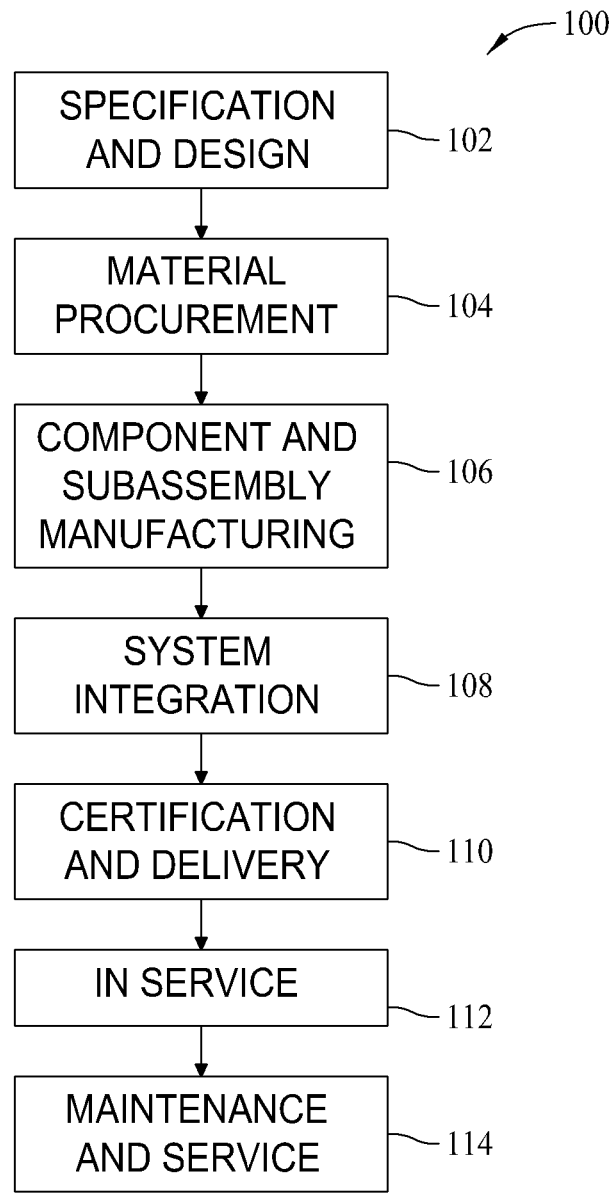
FIG. 1 is a flow diagram of an exemplary aircraft production and service methodology.
Figure 2:
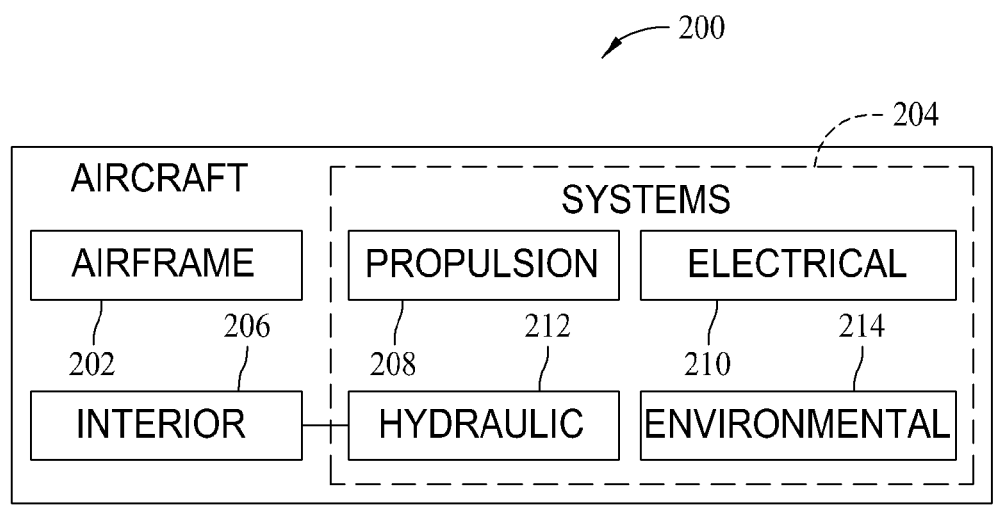
FIG. 2 is a block diagram of an exemplary aircraft.

Referring more particularly to the drawings, embodiments of the disclosure may be described in the context of aircraft manufacturing and service method 100 as shown in FIG. 1 and an aircraft 200 as shown in FIG. 2. In particular, FIG. 1 is a flow diagram of an exemplary aircraft production and service methodology and FIG. 2 is a block diagram of an exemplary aircraft. During pre-production, method 100 may include specification and design 102 of an aircraft 200, and/or material procurement 104.

During production, component and subassembly manufacturing 106 and system integration 108 of aircraft 200 occurs. Thereafter, aircraft 200 may go through certification and delivery 110 prior to being placed in service 112. Once in service, aircraft 200 is scheduled for routine maintenance and service 114 (which may also include, for example, modification, reconfiguration, and/or refurbishment).

Each of the processes included within aircraft manufacturing and service method 100 may be performed or carried out by a system integrator, a third party, and/or an operator (e.g., a customer). For the purposes of this description, a system integrator may include, without limitation, any number of aircraft manufacturers and/or major-system subcontractors, and a third party may include, for example, without limitation, any number of vendors, subcontractors, and/or suppliers. Moreover, an operator may be an airline, a leasing company, a military entity, and/or a service organization.

In the exemplary embodiment, aircraft 200 produced by aircraft manufacturing and service method 100 may include an airframe 202 including a plurality of systems 204 and an interior 206. Systems 204 may include any one of a propulsion system 208, an electrical system 210, a hydraulic system 212, and/or an environmental system 214. Any number of other systems may be included in alternative embodiments. Although an aerospace example is illustrated and described, the principles of the disclosure may be applied to other industries, such as the automotive industry, for example.

The apparatus and methods described herein may be employed during any one or more of the fabrication and/or assembly stages of aircraft manufacturing and service method 100. For example, and without limitation, components or subassemblies corresponding to component and subassembly manufacturing 106 may be fabricated or manufactured in a manner similar to components or subassemblies produced while aircraft 200 is in service.

In addition, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service.

Figure 3:
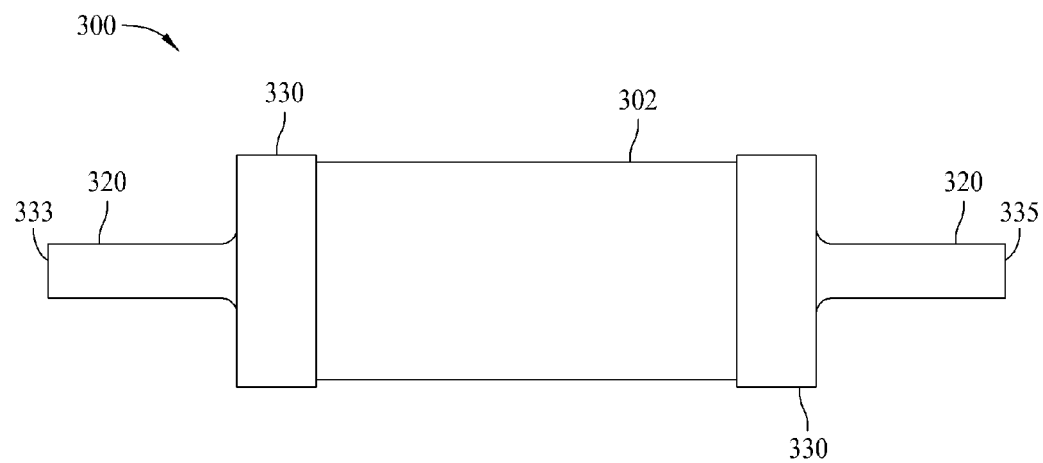
FIG. 3 is a side view illustration of a rigid coupler that may be used with the aircraft shown in FIG. 2 for conveying fluid between adjoining sections of a fluid conveyance system.
Figure 4:
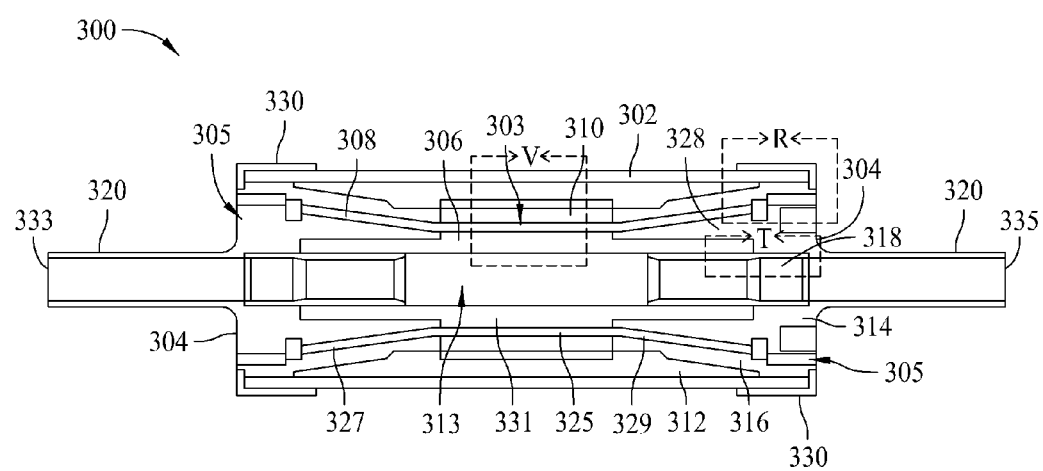
FIG. 4 is a cross-section illustration of the coupler shown in FIG. 3.
Figure 5:
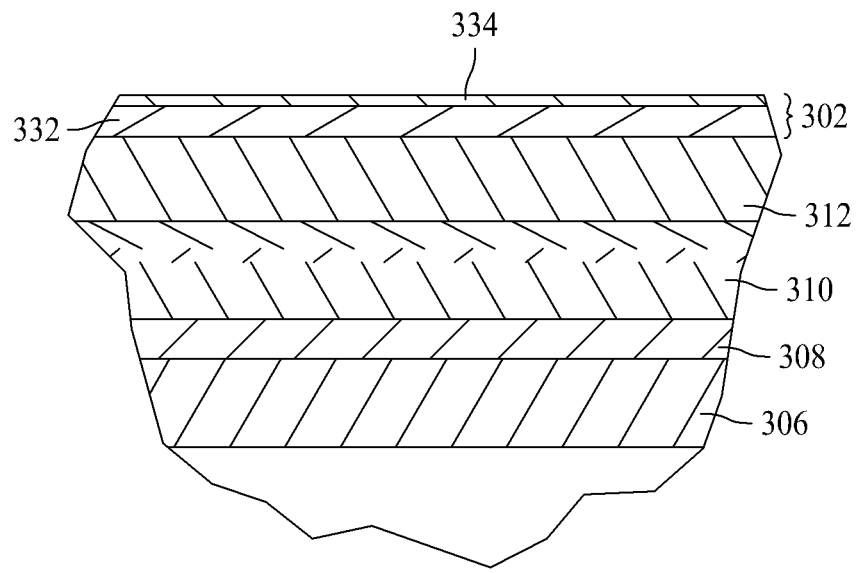
FIG. 5 is an enlarged view of a portion of the coupler shown in FIG. 4 and taken along area V.
Figure 6:
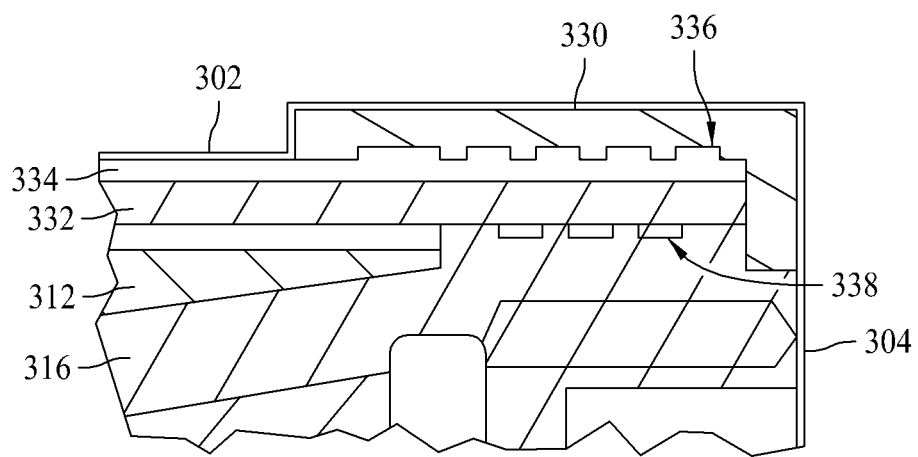
FIG. 6 is an enlarged view of a portion of the coupler shown in FIG. 4 and taken along area R.
Figure 7:
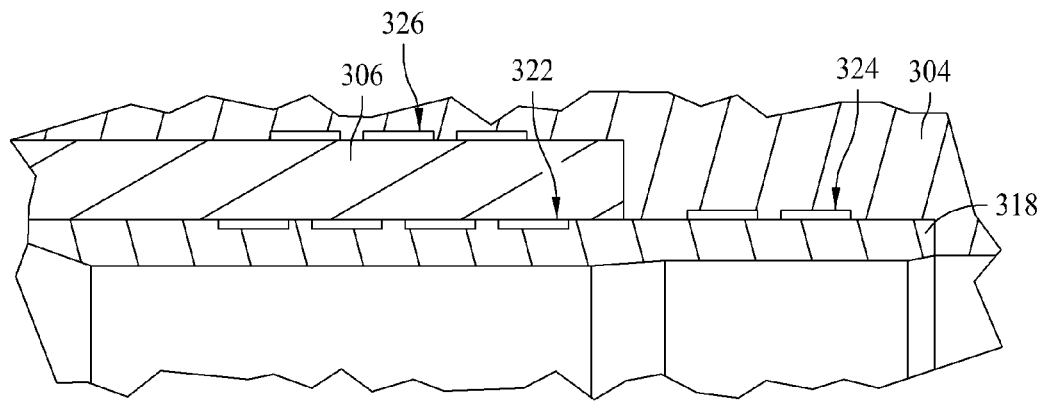
FIG. 7 is an enlarged view of a portion of the coupler shown in FIG. 4 and taken along area T.
Figure 8:
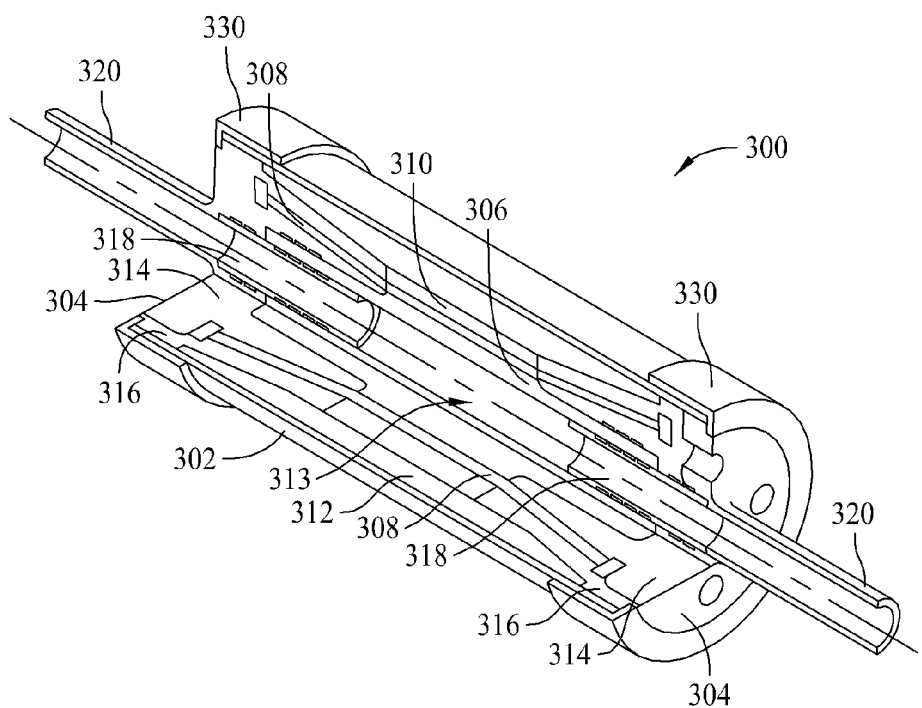
FIG. 8 is an isometric partial cutaway view of the coupler shown in FIG. 3.

Turning now to FIGS. 3-8, a rigid coupler 300 for conveying fluid between adjoining sections of a fluid conveyance system is illustrated. More specifically, FIG. 3 is a side view illustration of rigid coupler 300 that may be used with the aircraft shown in FIG. 2 for conveying fluid between adjoining sections of a fluid conveyance system, while FIG. 4 is a cross-section illustration of rigid coupler 300. FIGS. 5, 6 and 7 are enlarged views of portions of rigid coupler 300 as shown in FIG. 4 and taken along detail areas V, R and T, respectively. FIG. 8 is an isometric partial cutaway view of rigid coupler 300.

As shown in FIGS. 3, 4, and 8, in the exemplary embodiment, rigid coupler 300 includes a tubular sleeve 302 that defines an interior cavity 303 within rigid coupler 300. Sleeve 302 is formed with an opening 305 at each end. Each opening 305 is closed by an end fitting 304. A nonconductive seal/liner 306 (referred to hereinafter as nonconductive liner 306) is inserted within interior cavity 303 and is coupled to end fittings 304. A reinforcing structure 308 circumscribes nonconductive liner 306 and is coupled to end fittings 304. An overwrap 310 is hoop wound about a portion of reinforcing structure 308, and a resilient filler 312 extends between overwrap 310 and sleeve 302.

Nonconductive liner 306, in the exemplary embodiment, is a generally cylindrical, high-pressure liner that includes a hollow interior 313 for use in channeling fluid through rigid coupler 300. Specifically, nonconductive liner 306 is coupled to end fittings 304 that are used to couple together fluid lines (not shown) of adjoining sections of a fluid conveyance system (not shown). In addition to channeling fluid, nonconductive liner 306 provides an electric break between adjacent, typically metallic, fluid lines to which rigid coupler 300 is connected. Nonconductive liner 306 may be fabricated from any suitable nonconductive material. In the exemplary embodiment, nonconductive liner 306 is fabricated from a material that is sufficiently deformable and that is stable to form a seal as end fitting 304 is swaged to nonconductive liner 306, described in more detail below. Further, because fluid passing through rigid coupler 300 is channeled through nonconductive liner 306, nonconductive liner 306 should be made from a material capable of tolerating the fluid to be channeled therethrough. If rigid coupler 300 is used in a hydraulic system, nonconductive liner 306 is fabricated from a material capable of tolerating corrosive hydraulic fluid. Similarly, the material selected for nonconductive liner 306 should be capable of withstanding elevated fluid temperatures to which it may be subjected. Because, the fluid channeled through nonconductive liner 306 is likely to be at a relatively high pressure, nonconductive liner 306 should be fabricated from a material capable of withstanding the pressures which will be exerted on it by the fluid and the fluid conveyance system. For example, in some embodiments, nonconductive liner 306 is fabricated from polytetrafluoroethylene (PTFE) material. In other embodiments, nonconductive liner 306 may be fabricated from polychlorotrifluoroethylene (PCTFE) material.

End fittings 304 are multi-piece assemblies that seal the openings 305 and that couple to nonconductive liner 306. Each end fitting 304 includes an inner end fitting 314 and an outer end fitting 316. Each inner end fitting 314 includes a collar 318 and a connector 320. When rigid coupler 300 is assembled, collar 318 is positioned internally to rigid coupler 300, and connector 320 extends outward from rigid coupler 300. Connectors 320 couple fluid lines (not shown) of adjoining sections of a fluid conveyance system (not shown). In the exemplary embodiment, each connector 320 is a hollow tube that is coupled in fluid communication with a collar 318 coupled to its inner end fitting 314. In some embodiments, connector 320 is integrally formed with inner end fitting 314.

Collar 318 is hollow and is coupled to nonconductive liner 306. During assembly, collar 318 is inserted into nonconductive liner 306 and is swaged to nonconductive liner 306 and inner end fitting 314. As shown in FIG. 7, collar 318 includes swaging grooves 322 that enable collar 318 to be swaged to nonconductive liner 306 by radially expanding collar 318 in the area of swaging grooves 322. The radial expansion deforms nonconductive liner 306 such that portions of nonconductive liner 306 extend into swaging grooves 322, thus limiting movement of collar 318 and reducing the possibility of collar 318 being uncoupled from nonconductive liner 306. Swaging collar 318 to nonconductive liner 306 facilitates enhanced sealing between collar 318, inner end fitting 314, and nonconductive liner 306.

In some embodiments, collar 318 is formed separately from inner end fitting 314 and is coupled to inner end fitting 314. Collar 318 may be fabricated from the same material as the remainder of inner end fitting 314 or may be fabricated from a different material. In some embodiments, collar 318 may be fabricated from a material having good plastic deformation characteristics that facilitate relatively easy swaging to nonconductive liner 306 and inner end fitting 314. In other embodiments, collar 318 may be friction welded to inner end fitting 314. The remainder of inner end fitting 314 is typically fabricated from a harder, less easily deformable, material than collar 318. In some embodiments, collar 318 is fabricated from a corrosion resistant steel material and the remainder of inner end fitting 314 is fabricated from a titanium alloy.

Still referring to FIG. 7, inner end fitting 314 includes swaging grooves 324 defined adjacent an external portion of collar 318 and swaging grooves 326 that are defined adjacent an external portion of nonconductive liner 306. More specifically, swaging grooves 326 are defined adjacent to inner end fitting 314 at a location opposite swaging grooves 322 of collar 318. Thus, when collar 318 is swaged to nonconductive liner 306, nonconductive liner 306 is also deformed into swaging grooves 326 such that nonconductive liner 306 is thereby also coupled to inner end fitting 314 via swaging grooves 326. Similarly, collar 318 is swaged into swaging grooves 324, further coupling collar 318 to inner end fitting 314. Swaging the deformable collar 318 into the groves 324 in inner end fitting 314 may improve coupling and sealing between collar 318 and inner end fitting 314.

In some embodiments, nonconductive liner 306 is swaged between corrosive resistant steel (CRES) swaging collar 308 and a titanium inner end fitting 314. This produces a seal that may remain leak free are pressures of about 20,000 psi and higher.

With reference now to FIGS. 4 and 8, in the exemplary embodiment, reinforcing structure 308 is a hollow structure that circumscribes nonconductive liner 306. Reinforcing structure 308 is generally shaped as a tube with a central portion 325 between flared ends 327 and 329. Central portion 325 of reinforcing structure 308 circumscribes and contacts a central portion 331 of nonconductive liner 306. The flared portions 327 and 329 of structure 308 are captured between inner end fitting 314 and outer end fitting 316 of end fitting 304. A projection 328 extending from inner end fitting 314 extends between an outer surface of nonconductive liner 306 and an inner surface of each flared portion 327 and 329 of reinforcing structure 308. During use, reinforcing structure 308 carries axial loading induced to rigid coupler 300.

In the exemplary embodiment, reinforcing structure 308 is fabricated from a tri-axial braid fiber material that has a tight braid structure consisting of ±θ fibers and axially-oriented fibers. The specific percentage of axially-oriented fibers can be varied, as can the orientation of the ±θ fibers. Moreover, the tri-axial braid fiber material may be any high strength fiber material that is suitable for reinforcing rigid coupler 300. In some embodiments, the tri-axial braid fiber material is a para-aramid fiber material. In one embodiment, the reinforcing structure 308 is constructed by impregnating the tri-axial braid fiber material with a matrix material, e.g. a resin, and curing the matrix material.

In some embodiments, reinforcing structure 308 includes more than one layer of tri-axial braid fiber material. The number of layers of tri-axial braid fiber material is variably selected based on the desired thickness and strength of reinforcing structure 308. For example, in some embodiments, reinforcing structure 308 may include a four-layer braid of tri-axial braid fiber material.

Overwrap 310 is a composite overwrap that includes fiber that is hoop wound about central portion 325 of reinforcing structure 308 and that is impregnated with a matrix material, e.g. a resin. During use, overwrap 310 carries much of the hoop stresses experienced by rigid coupler 300, and more particularly by nonconductive liner 306. Overwrap 310 may be fabricated from any high strength fiber material that is suitable for bearing hoop stresses induced to rigid coupler 300. In some embodiments, the fiber material is a para-aramid fiber material. The non-conductive braid of reinforcing structure 308 and non-conductive overwrap 310 form a non-conductive separation distance between conductive end fittings 304. This separation distance may be established by design requirements for separation distance between external metallic pieces.

Resilient filler 312 is between sleeve 302, overwrap 310, and outer end fitting 316. Resilient filler 312 occupies otherwise unoccupied space to produce a desired outer shape for fitting sleeve 302 and provides an additional barrier against external moisture, fuel, etc. for rigid coupler 300. Resilient filler 312 may be any suitable resilient filler, such as, but not limited to, a rubber material, for example. In some embodiments, resilient filler 312 is a synthetic rubber. In some embodiments, resilient filler 312 is a fluoropolymer elastomer. In some embodiments, resilient filler 312 is a low temperature fluoropolymer elastomer.

In the exemplary embodiment, sleeve 302 is a tubular sleeve that defines interior cavity 303 that is sized to enclose nonconductive liner 306, reinforcing structure 308, overwrap 310, resilient filler 312, and portions of end fittings 304. Sleeve 302 functions as a fuel and moisture barrier for rigid coupler 300 and provides an electrically-conductive external path extending between opposing ends 333 and 335 of rigid coupler 300, and thus between adjoining sections of a fluid conveyance system (not shown) to which reinforcing structure 308 is connected. The small electric current that the electrically-conductive external path allows to be conducted through sleeve 302 may limit, reduce, and/or prevent charge accumulation and/or sparking from end fittings 304 and/or crimping ferrules 330 (discussed below), particularly in high voltage applications.

With reference to FIGS. 4 and 5, in the exemplary embodiment, sleeve 302 is formed with two layers: an inner layer 332 and an outer layer 334. Outer layer 334 is electrically-conductive and has a relatively high resistance. In some embodiments, outer layer 334 is about 0.01 inches thick. Inner layer 332 is nonconductive and functions as a fluid and moisture barrier for rigid coupler 300. The two layers 332 and 334 are fused, e.g. thermally fused, together such that substantially no gaps and/or voids are formed between the layers 332 and 334. Both inner layer 332 and outer layer 334 may be fabricated from a thermoplastic polymer material. In some embodiments, inner layer 332 and outer layer 334 are both fabricated from a PTFE material. To control the conductivity of outer layer 334, a conductive filler, such as carbon black, is added to the PTFE material to form outer layer 334. The amount of carbon black may be varied to vary the resistance of outer layer 334. The inner layer 332, which does not have conductive filler added, may be less permeable than the outer layer 334, which does include conductive filler, to outside environmental elements such as humidity, jet fuel and other fluids that may degrade the strength of the rigid coupler 300 over time. In other embodiments, sleeve 302 may be manufactured from single layer. In such a single layer embodiment, the entire thickness of sleeve 302 has a conductive filer, such as carbon black, added. As with the two layer design, the amount of added conductive filler is determined by the required resistance of sleeve 302.

Sleeve 302 is coupled to end fittings 304 via crimping ferrules 330. Each crimping ferrule 330 circumscribes a portion of sleeve 302 and an end fitting 304. Crimping ferrules 330 are crimped to connect sleeve 302 to end fittings 304. As shown in FIG. 6, each crimping ferrule 330 includes grooves 336. Moreover, end fittings 304 also include grooves 338 defined on an exterior surface of outer end fitting 316. When crimping ferrules 330 are crimped, a portion of sleeve 302 is forced into grooves 336 and into grooves 338 to form a strong connection and a seal between sleeve 302, end fittings 304, and crimping ferrule 330. The distance between the crimping ferrules 330 may be established by design requirements for separation distance between external metallic pieces.

In the exemplary embodiment, crimping ferrules 330 electrically couple outer layer 334 of sleeve 302 to end fittings 302. Crimping ferrules 330 may be fabricated from any conductive material suitable for mechanically coupling sleeve 302 to end fittings 304 and providing an electrical path between end fittings 304 and sleeve outer layer 334. In some embodiments, crimping ferrules 330 are fabricated from a corrosion resistant steel material, such as 304 CRES.

Figure 9:
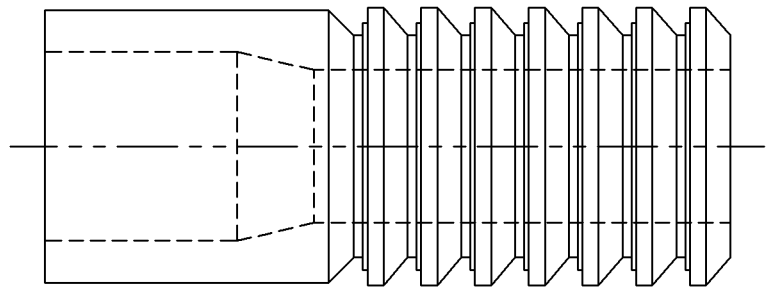
FIG. 9 is a side view of buttress form swaging grooves usable in the coupler shown in FIG. 3.
Figure 10:
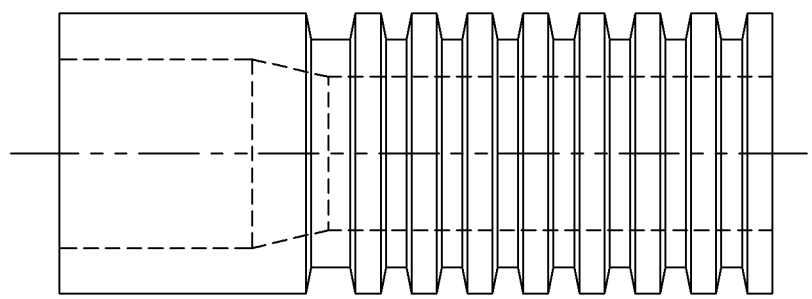
FIG. 10 is a side view of acame form swaging grooves usable in the coupler shown in FIG. 3.
Figure 11:
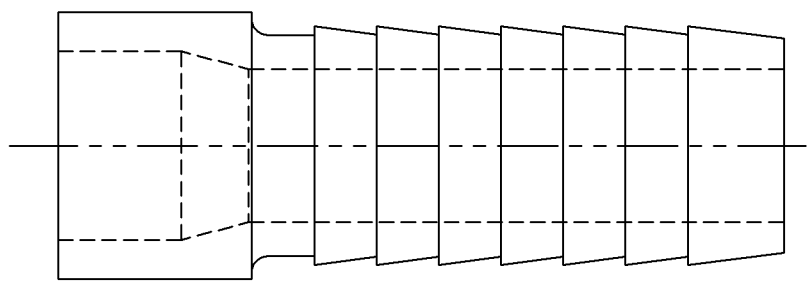
FIG. 11 is a side view of barb form swaging grooves usable in the coupler shown in FIG. 3.

FIGS. 9-11 illustrate various forms of swaging grooves that are suitable for use in rigid coupler 300. More specifically, FIG. 9 is a side view of buttress form swaging grooves, FIG. 10 is a side view of acame form swaging grooves, and FIG. 11 is a side view of barb form swaging grooves.

Swaging grooves 322, 324, 326, 336, and 338 illustrated in FIGS. 3-8, and described above, generally each have a rectangular shape. Alternatively, any of swaging grooves 322, 324, 326, 336, and/or 338 may have any other suitable shape that enables swaging grooves 322, 324, 326, 336, and/or 338 to function as described herein. FIGS. 9-11 illustrate several such suitable shapes for swaging grooves 322, 324, 326, 336, and/or 338. For example, FIG. 9 illustrates swaging grooves having a buttress form. FIG. 10 illustrates swaging grooves having an acame form and FIG. 11 illustrates swaging grooves having a barb form.

Figure 12:
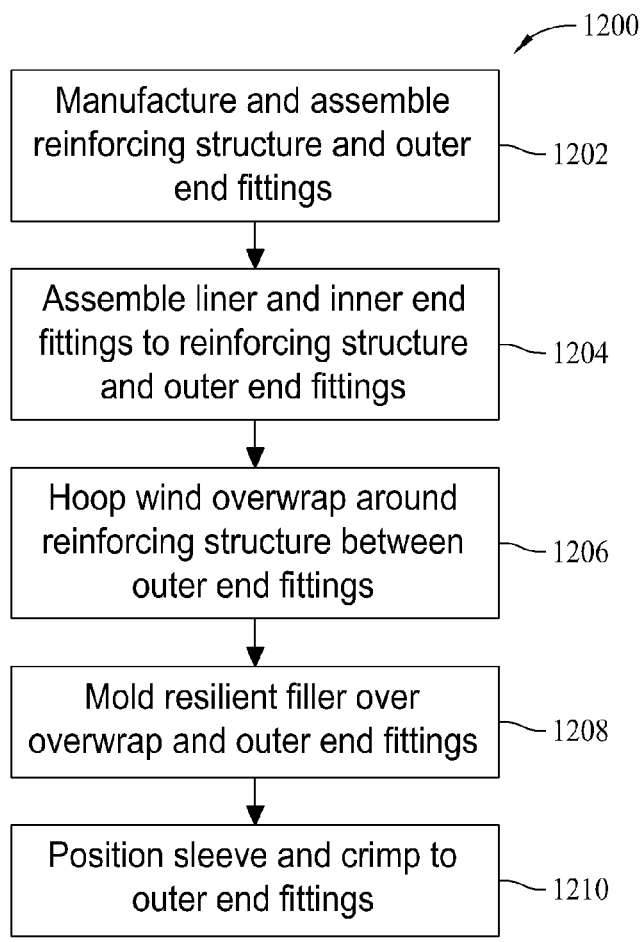
FIG. 12 is a block diagram of a method of manufacturing and assembling a rigid coupler.
Figure 13:
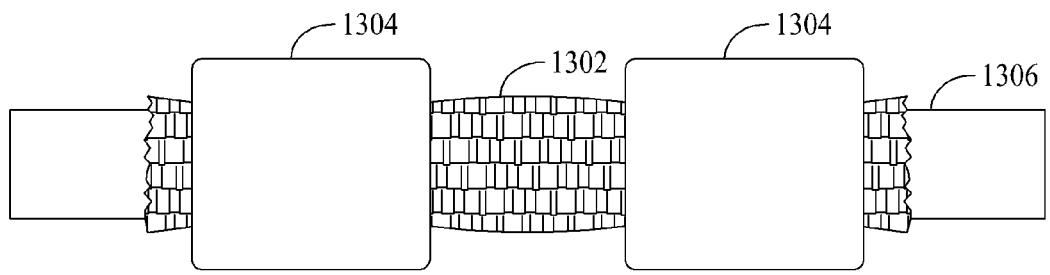
FIG. 13 is an illustration of an exemplary tri-axial braided fiber and inner end fitting blanks prepared for resin transfer molding.
Figure 14:
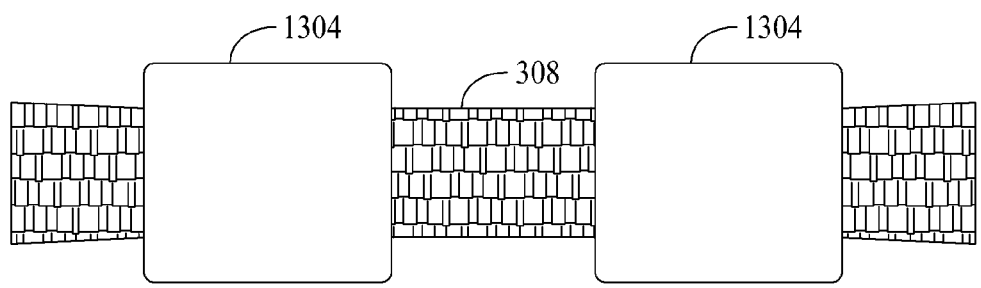
FIG. 14 is an illustration of the tri-axial braided fiber and end fitting blanks shown in FIG. 13 after impregnation of the fiber with a matrix material.
Figure 15:
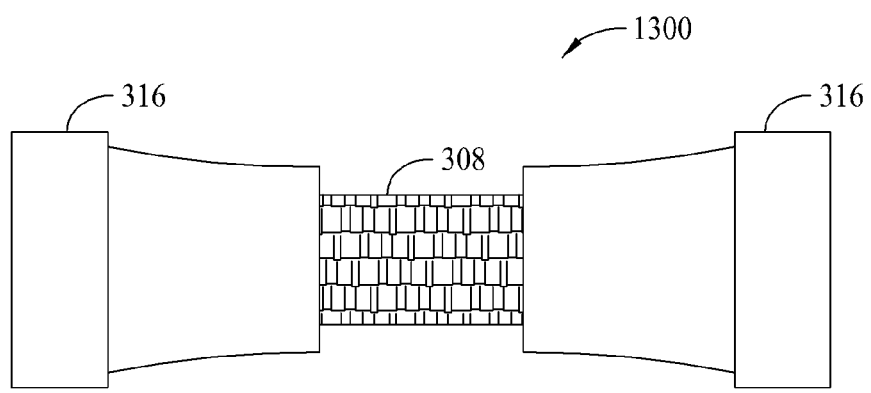
FIG. 15 is a side view of an exemplary assembly for use in a rigid coupler.
Figure 16:
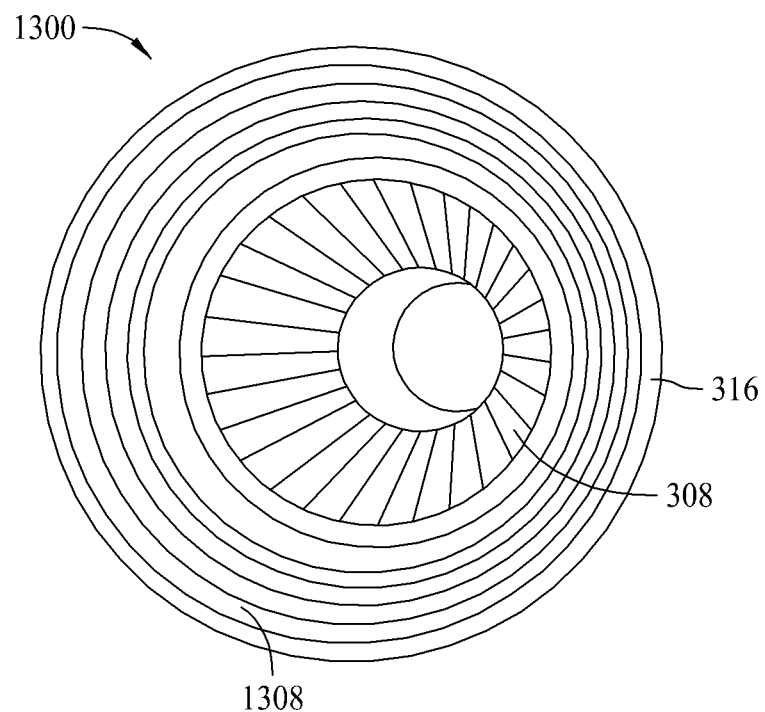
FIG. 16 is an end view of the assembly shown in FIG. 15.
Figure 17:
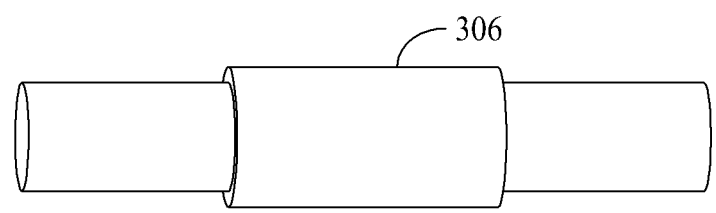
FIG. 17 is an illustration of an exemplary nonconductive liner for use with the assembly shown in FIG. 15.
Figure 18:
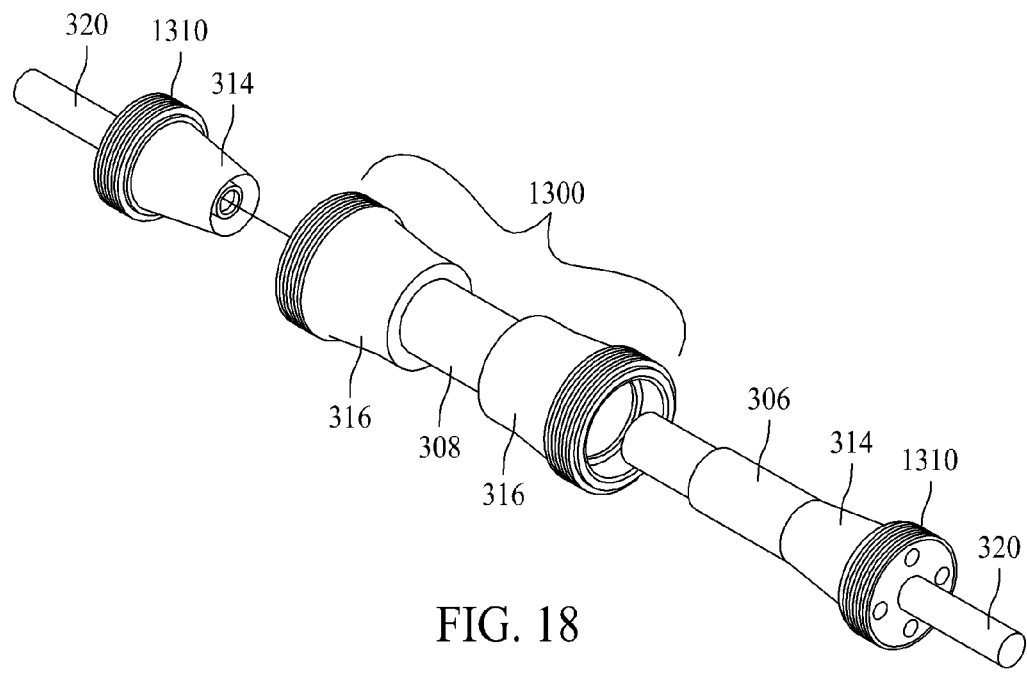
FIG. 18 is an exploded view of the nonconductive liner of FIG. 14, two inner end fittings, and the assembly shown in FIG. 15.
Figure 19:
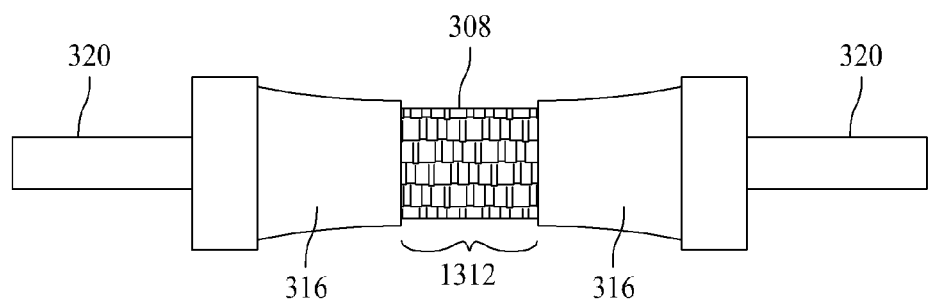
FIG. 19 is an illustration of a partially complete rigid coupler including the assemblies shown in FIG. 18.
Figure 20:
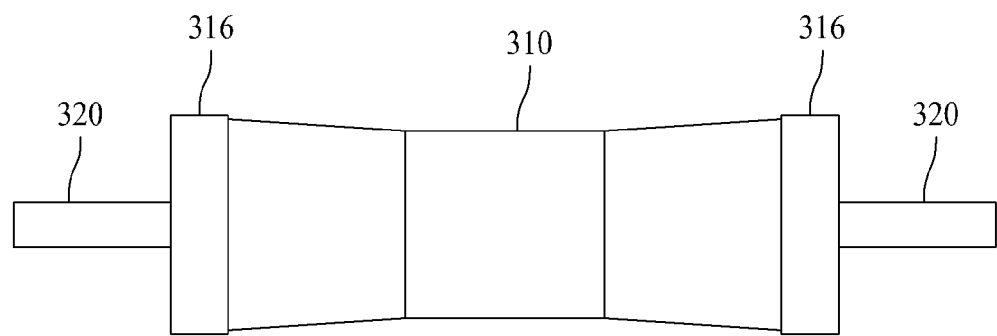
FIG. 20 is an illustration of the rigid coupler shown in FIG. 19 and including an overwrap.
Figure 21:
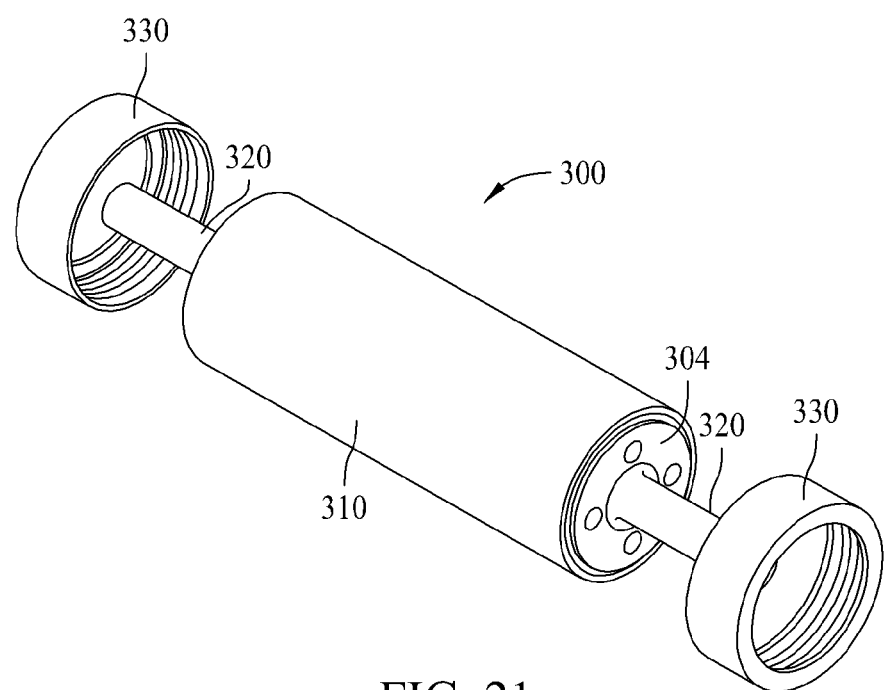
FIG. 21 is an isometric view of an exemplary rigid coupler before its crimping ferrules are attached.

Referring now to FIGS. 12-21, the manufacture and assembly of rigid coupler 300 will be described. Specifically, FIG. 12 is a block diagram of a method of manufacture and assembly of a rigid coupler. FIG. 13 is an illustration of an exemplary tri-axial braided fiber and outer end fitting blanks prepared for resin transfer molding, and FIG. 14 is an illustration of the tri-axial braided fiber and end fitting blanks shown in FIG. 13 after impregnation of the fiber with a matrix material. FIG. 15 is a side view of an exemplary final machined braid/outer fitting assembly for use in a rigid coupler, while FIG. 16 is an end view of the assembly shown in FIG. 15. FIG. 17 is an illustration of an exemplary nonconductive liner for use with the assembly shown in FIG. 15. FIG. 18 is an exploded view of the nonconductive liner shown in FIG. 17, two inner end fittings and the assembly shown in FIG. 15. FIG. 19 is an illustration of a partially complete rigid coupler including the assemblies shown in FIGS. 15 and 18. FIG. 20 is an illustration of the exemplary rigid coupler shown in FIG. 19 and including an overwrap. FIG. 21 is an isometric view of an exemplary rigid coupler before its crimping ferrules are attached.

FIG. 12 illustrates an example method 1200 of manufacturing and assembling rigid coupler 300. Method 1200 includes manufacturing and assembling 1202 reinforcing structure 308 and outer end fitting 316. As shown in FIG. 13, tri-axial braided fiber 1302 for the reinforcing structure 308 and outer fitting blanks 1304 are positioned in a mold 1306 (only part of which is illustrated). Resin transfer molding is then used to impregnate tri-axial braided fiber 1302 with a matrix material and the matrix material is cured. This intermediate structure, shown in FIG. 14, is then machined, e.g., turned on a lathe, etc., to produce the assembly 1300, shown in FIGS. 15 and 16. In particular, blanks 1304 are machined into the desired size and shape for outer end fitting 316 and excess portions of reinforcing structure 308 are removed. As seen in FIG. 16, inner threads 1308 are also machined into an inside surface of outer end fitting 316 for mating engagement with complimentary threads (shown in FIG. 18 and described below) on an outer surface of inner end fitting 314. Inner threads 1308 are used to assemble inner end fitting 314 and outer end fitting 316 together by torquing inner end fitting 314 into the outer fitting 316.

Nonconductive liner 306 and inner end fittings 314 are next assembled 1204 to assembly 1300. A tubular, nonconductive material is formed (e.g. machined, molded, etc.) into the desired size and shape of nonconductive liner 306, as shown in FIG. 17. Nonconductive liner 306 is inserted into position in assembly 1300. Inner end fittings 314 are inserted into assembly 1300 so that collars 318 (not shown in FIGS. 13-21) are positioned within nonconductive liner 306. FIG. 18 shows an exploded view of the resulting configuration of nonconductive liner 306 and inner end fittings 314 with reinforcing structure 308 and outer end fittings 316. The outside diameter of inner fittings 314 is tapered to match the internal diameter taper of the reinforcing structure 308. Threads 1310 on an outer surface of inner end fitting 314 are engaged with inner threads 1308 in outer end fitting 316 to couple inner end fitting 314 to outer end fitting 316 and assembly 1300. When inner end 314 is connected to outer end fitting 316 and torqued up, inner end fitting 314, and specifically the outer diameter tapered portion, compresses reinforcing structure 308 radially. As a result, reinforcing structure 308 is trapped and clamped (torqued) between tapered surfaces of inner and outer end fitting 314 and 316 to form a strong joint that can carry high pressure axial loads and provide extra strength during tension loading. Collars 318 are swaged to connect collars 318 and inner end fittings 314 to nonconductive liner 306 as described above. These procedures produce the partially completed rigid coupler 300 shown in FIG. 19.

Referring specifically to FIGS. 19 and 20, overwrap 310 is formed by hoop winding 1206 a fiber material about a middle portion 1312 of assembly 1300 between outer end fittings 316. Middle portion 1312 is a gap between the two conductive outer end fittings 316. The size of this gap (sometimes referred to as an internal gap between two conductive parts) may be varied according to design requirements and particular applications for which rigid coupler 300 will be used. The fiber is impregnated with a matrix material and the matrix material is cured, producing overwrap 310.

Resilient filler 312 is molded 1208 over overwrap 310 and outside surface of outer end fitting 316 (not shown in FIGS. 12-20). In other embodiments, resilient filler may be applied by any other suitable method of application.

With reference now to FIG. 21, sleeve 302 is positioned and crimped 1210 to outer end fittings 304. Sleeve 302 is positioned around assembly 1300, nonconductive liner 306, end fittings 304, overwrap 310, and resilient filler 312. Crimping ferrules 330 are crimped around sleeve 302 and end fittings 304 to connect end fittings 304 and sleeve 302.

In some embodiments, the steps described above for assembling rigid coupler 300, may be performed in different orders than described above. Similarly, some steps may be omitted or changed in some embodiments.

Although rigid coupler 300 has been illustrated above as generally cylindrical in shape, rigid coupler 300 may have any desired shape. For example, rigid coupler 300 may have a rectangular shape, a hexagonal shape, etc.

When rigid couplers are fabricated as described herein, the rigid couplers may have characteristics superior to some known rigid couplers. Coupling a nonconductive liner to a collar by swaging may provide a better seal than o-rings and other known sealing methods. The combination of an axial braid composite reinforcing structure and hoop wound composite overwrap may result in a stronger coupler. Further, this combination permits the axial braid reinforcing structure to carry axial loads and the hoop wound fiber to carry hoop stresses. As a result, analysis of load, stress, strain, etc. may be easier than with some known couplers using a difficult to analyze helically wound reinforcing structure. The inclusion of a two layer sleeve provides an appropriately resistive electrical path and an additional moisture and fuel barrier.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

An element or step recited in the singular and proceeded with the word "a" or "an" should be understood as not excluding plural elements or steps unless such exclusion is explicitly recited. Moreover, references to "one embodiment" of the present disclosure and/or the "exemplary embodiment" are not intended to be interpreted as excluding the existence of additional embodiments that also incorporate the recited features.

What is claimed is:

1. A rigid coupler for use in a fluid conveyance system, said rigid coupler comprising:
    a nonconductive liner comprising a first end and a second end, opposite said first end;
    an end fitting coupled to each of said first end and said second end of said nonconductive liner, said end fittings configured to couple opposing adjoining sections of the fluid conveyance system;
    a reinforcing structure circumscribing said nonconductive liner and coupled to a portion of said nonconductive liner extending between said first and second ends of said nonconductive liner, said reinforcing structure comprising a multi-axial braided fiber material impregnated with a matrix material;
    a fiber overwrap hoop wound about at a least a portion of said reinforcing structure between said first and second ends of said nonconductive liner; and
    a sleeve comprising an interior cavity defined therein, said cavity sized to receive said nonconductive liner, said reinforcing structure, and said fiber overwrap therein, said sleeve comprising a dielectric inner layer defining an inner surface of said interior cavity and a conductive layer defining an outer surface of said sleeve.

2. A rigid coupler in accordance with to claim 1, wherein said fiber overwrap comprises a fiber material impregnated with a matrix material.

3. A rigid coupler in accordance with claim 1 wherein the multi-axial braided fiber material comprises a plurality of layers of multi-axial braided fiber material.

4. A rigid coupler in accordance with claim 1, each end fitting comprising an inner end fitting comprising an external connector configured to couple to the first adjoining section of the fluid conveyance system and an internal collar coupled in fluid communication with said external connector and said nonconductive liner.

5. A rigid coupler in accordance with claim 4, wherein the internal collar is couple to an internal surface of said nonconductive liner via swaging.

6. A rigid coupler in accordance with claim 1, wherein each end fitting comprises a first projection and a second projection, said first projection extends between said nonconductive liner and said reinforcing structure, said second projection circumscribes a portion of said reinforcing structure.

7. A rigid coupler in accordance with claim 6 wherein an external surface of said nonconductive liner is coupled to an internal surface of said first projection via swaging.

8. A rigid coupler in accordance with claim 1, wherein said sleeve further comprises a first opening adjacent said nonconductive liner first end and a second opening adjacent said nonconductive liner second end.

9. A rigid coupler in accordance with claim 8, further comprising a first crimping ferrule, a second crimping ferrule, a first end fitting coupled to said nonconductive liner such that said sleeve first opening is substantially closed by said first end fitting, and a second end fitting coupled to said nonconductive liner such that said sleeve second opening is substantially closed by said second end fitting, wherein said first crimping ferrule couples said sleeve to said first crimping ferrule about said sleeve first opening, and wherein said second crimping ferrule couples said sleeve to said second crimping ferrule about said sleeve second opening.

10. A rigid coupler in accordance with claim 9, wherein said first and second crimping ferrules establish an electrically conductive path between said first and second end fittings and said sleeve conductive layer.

11. An assembly for use in a rigid coupler, said assembly comprising:
- a nonconductive liner, said nonconductive liner defining a first interior cavity therein;
- a reinforcing structure circumscribing said nonconductive liner and coupled to a portion of said nonconductive liner, said reinforcing structure comprising a multi-axial braided fiber material impregnated with a matrix material;
- a first outer end fitting circumscribing a portion of said reinforcing structure;
- a second outer end fitting circumscribing a portion of said reinforcing structure, said second outer end fitting spaced apart from said first outer end fitting along a length of said reinforcing structure;
- an inner end fitting coupled to each of said first outer end fitting and said second outer end fitting;
- a fiber overwrap hoop wound about at a least a portion of said reinforcing structure between said first and second outer end fittings; and
- a sleeve comprising a second interior cavity defined therein, said second cavity sized to receive said nonconductive liner and said reinforcing structure therein, said sleeve comprising a dielectric inner layer defining an inner surface of said second cavity and a conductive layer defining an outer surface of said sleeve.

12. An assembly in accordance with claim 11, wherein the multi-axial braided fiber material comprises a plurality of layers of multi-axial braided fiber.

13. An assembly in accordance with claim 11 wherein the multi-axial braided fiber material comprises a para-aramid fiber.

\* \* \* \* \*